Oct. 27, 1970   G. MEHNERT   3,535,739
DIE HEAD FOR PLASTIC EXTRUSION MACHINES
Filed Dec. 22, 1967   7 Sheets-Sheet 1

INVENTOR.
Gottfried Mehnert
BY Michael S. Streker
Attorney

Oct. 27, 1970　　　　　G. MEHNERT　　　　　3,535,739
　　　　　DIE HEAD FOR PLASTIC EXTRUSION MACHINES
Filed Dec. 22, 1967　　　　　　　　　　　　　　7 Sheets-Sheet 2
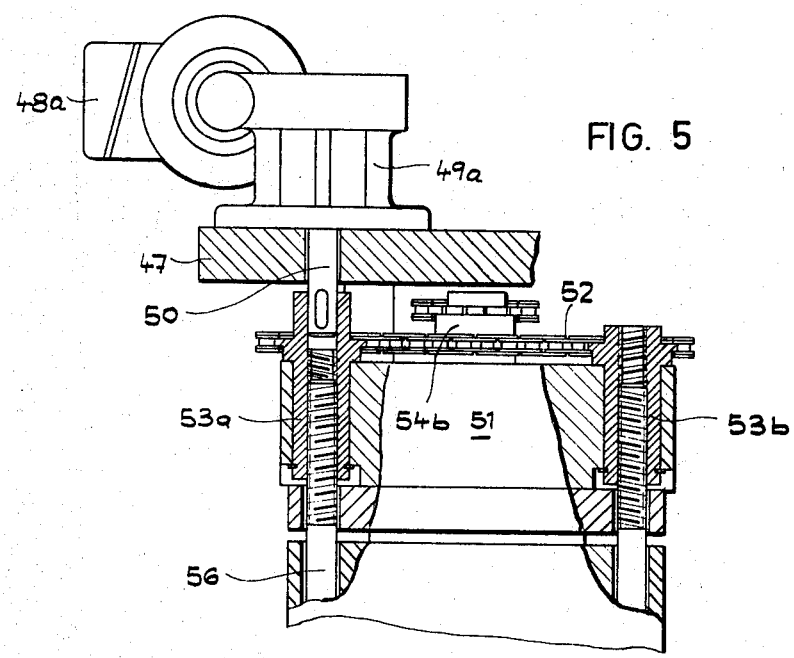
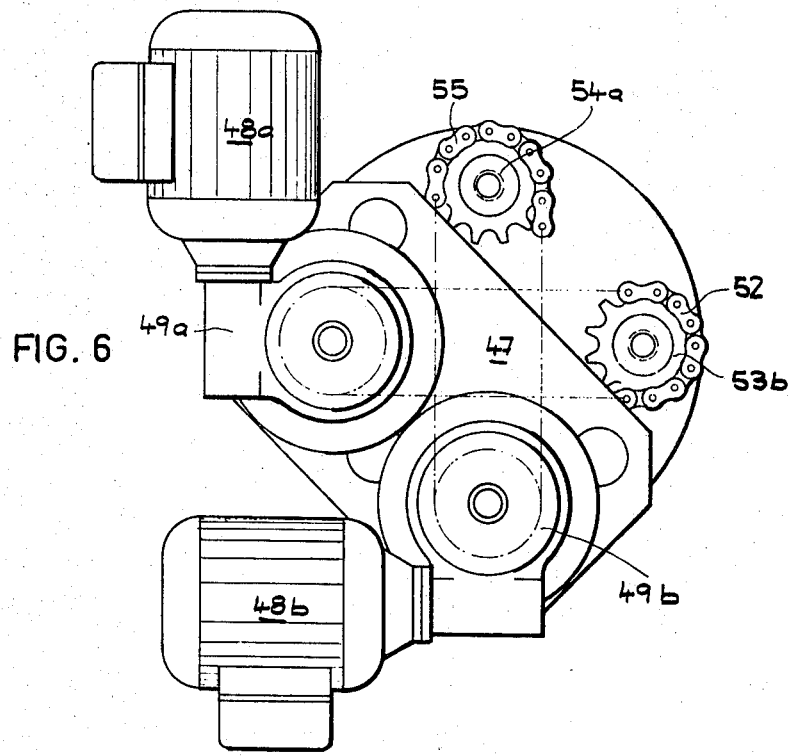
INVENTOR.
Gottfried Mehnert
BY Michael S Striker
　　Attorney

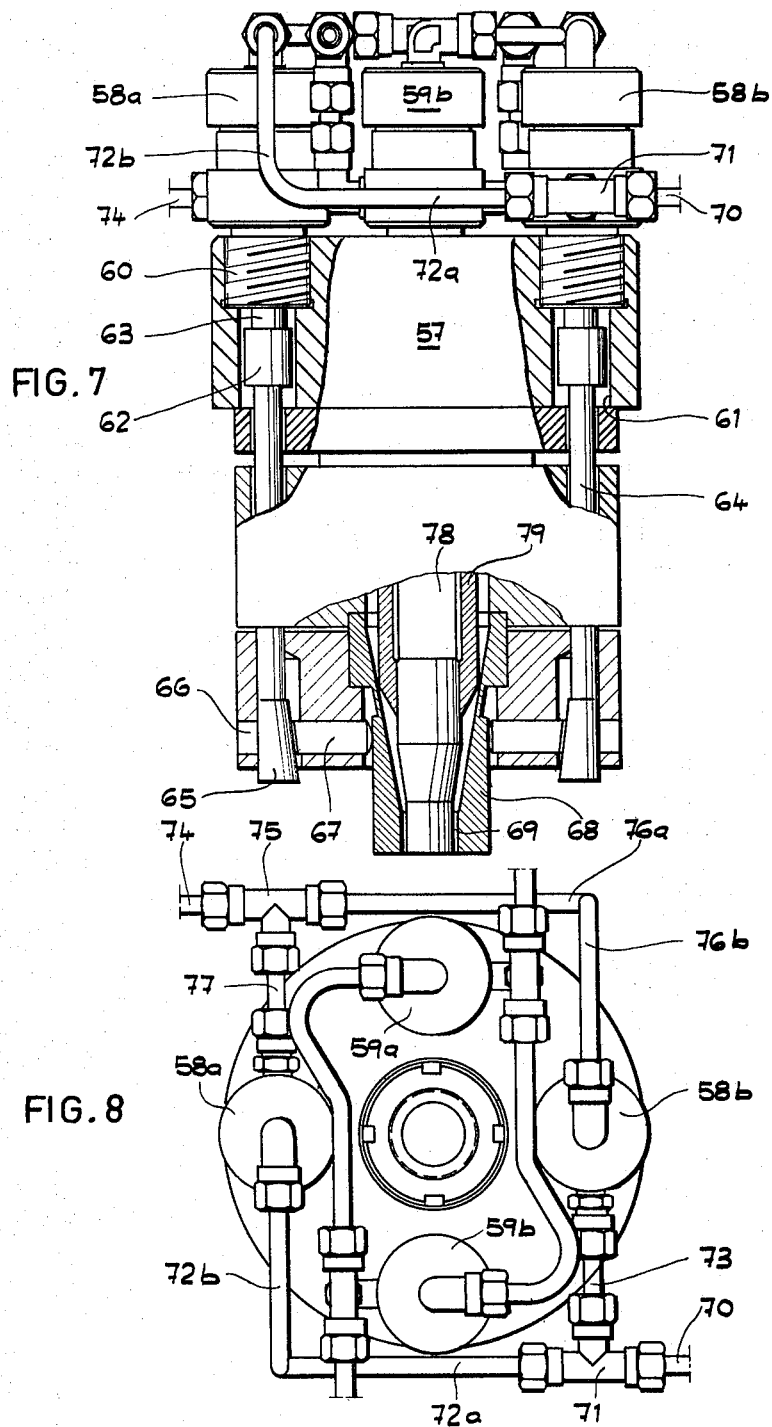

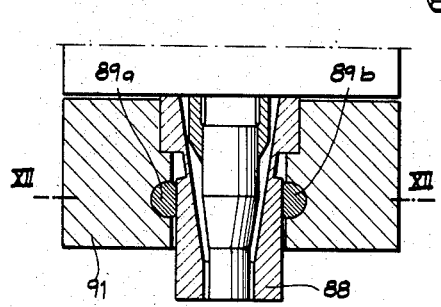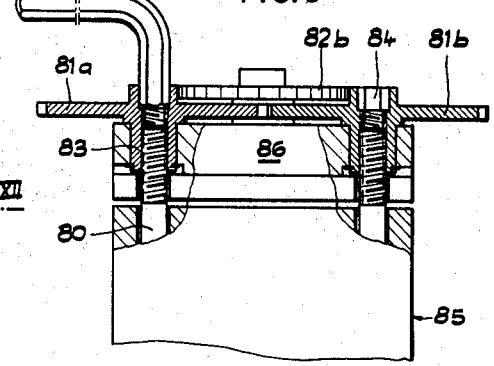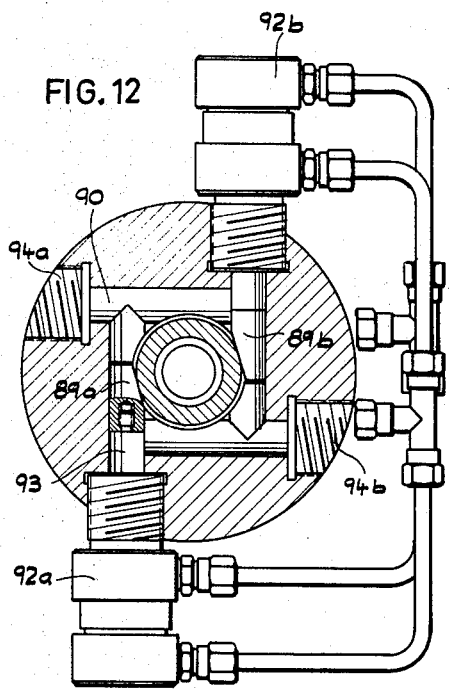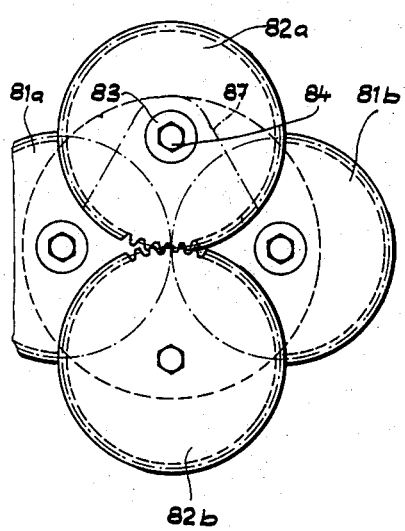

Oct. 27, 1970  G. MEHNERT  3,535,739
DIE HEAD FOR PLASTIC EXTRUSION MACHINES
Filed Dec. 22, 1967  7 Sheets-Sheet 6

INVENTOR.
Gottfried Mehnert
BY Michael S. Striker
Attorney

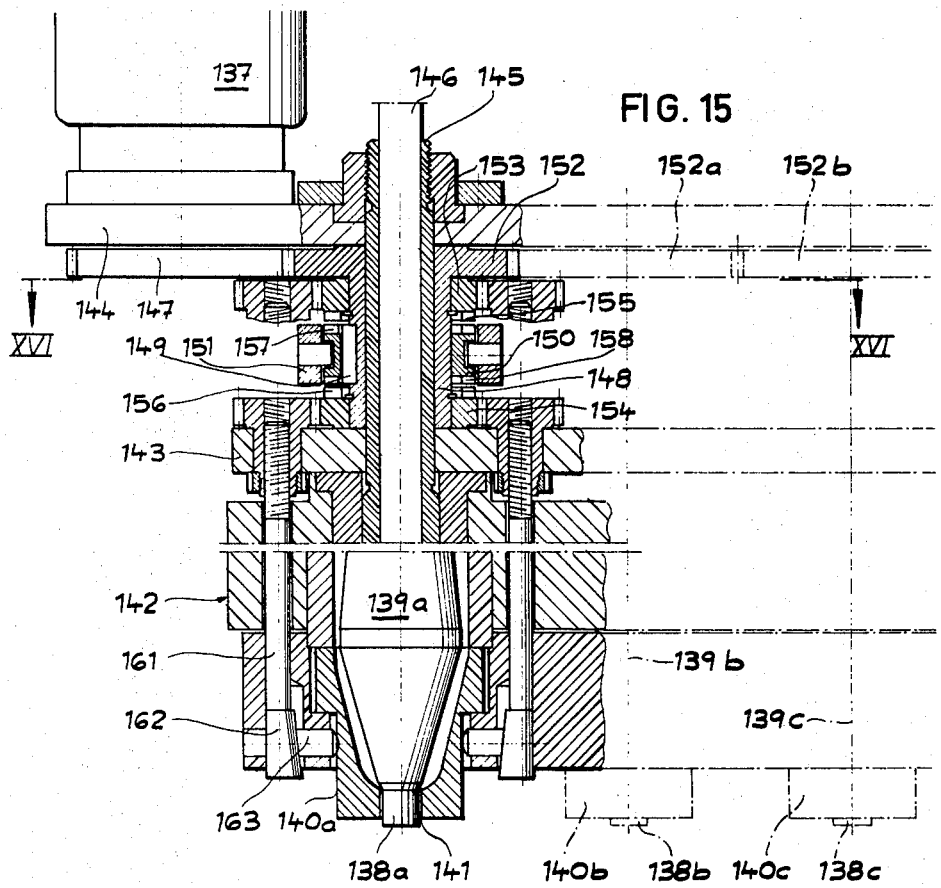
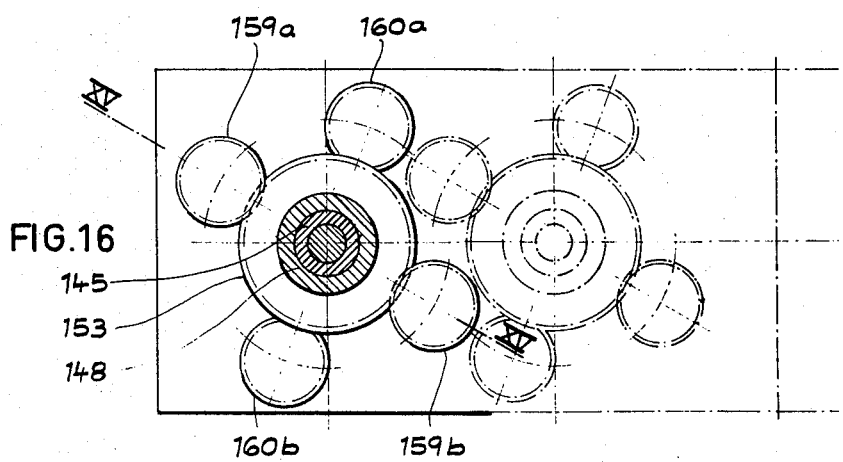

3,535,739
DIEHEAD FOR PLASTIC EXTRUSION MACHINES
Gottfried Mehnert, Berlin, Mariendorf, Germany, assignor to Conduco A.G., Zug, Switzerland
Filed Dec. 22, 1967, Ser. No. 692,974
Claims priority, application Germany, Dec. 30, 1966, M 72,240
Int. Cl. B29d 23/04; B29f 3/04
U.S. Cl. 18—14        30 Claims

ABSTRACT OF THE DISCLOSURE

A die head for use in plastic extrusion machines wherein a housing accommodates a nozzle defining with a fixed mandrel an annular orifice for extrusion of tubular parisons. At least the material discharging portion of the nozzle is adjustable radially of the mandrel to eliminate variations in the width of the orifice. The adjusting means comprises two pairs of adjusting devices which have cams, followers or analogous adjusting portions movable radially of the mandrel. The adjusting portions of each pair of adjusting devices are movable in the same direction because the respective adjusting devices are coupled to each other by synchronizing units which insure that one of the adjusting portions moves toward the mandrel to thus change the position of the nozzle when the associated adjusting portion moves away from the mandrel and through the same distance to provide a back support for the nozzle during adjustment by the one adjusting portion. The synchronizing units can be operated by hand or by means of one or more electric, hydraulic or pneumatic motors. Those portions of the synchronizing units which can be engaged by a manually operated tool or the like are remote from the orifice to prevent injury to the operator.

BACKGROUND OF THE INVENTION

The present invention relates to machines for the production of plastic articles, and more particularly to improvements in die heads which can be utilized in or on plastic extrusion machines. Still more particularly, the invention relates to improvements in die heads which can be used for producing and supplying parisons to the molds of blow molding apparatus wherein such parisons are converted into bottles, cans, cups, canisters, sleeves and/or other types of hollow plastic articles.

The mold or molds of a modern blow molding apparatus must receive a succession of tubular parisons each of which must have a predetermined wall thickness. Variations in the wall thickness of parisons result in the production of inferior hollow articles. If a portion of the parison wall is too thin, the parison is likely to burst in response to admission of compressed gas into the cavity of the blow mold. If a wall portion is too thick, the appearance and/or transparency or translucency of the finished article will be unsatisfactory. The parisons are formed by extruding plasticized material through an annular orifice defined by the tip of a core or mandrel and by an annular nozzle or sleeve which surrounds the tip and is adjustable in the housing of the die head. Even most accurate machining of the parts of a die head cannot prevent variations in the wall thickness of parisons when the die head is in use; therefore, such die heads are usually provided with adjusting or calibrating devices which are manipulated by hand to change the position of the nozzle with reference to the mandrel and to thus adjust the shape of the cross-sectional area of the orifice. Presently known calibrating or adjusting devices normally comprise a set of four radially arranged equidistant screws which mesh with the housing of the die head and are turnable by hand independently of each other to move their tips toward or away from the axis of the mandrel and to thus displace the entire nozzle or to flex a portion of the nozzle with reference to the housing so as to effect appropriate changes in the configuration of the orifice, i.e., to insure that the axis of the thus adjusted portion of the nozzle coincides exactly with the axis of the mandrel.

A serious drawback of such conventional adjusting devices is that the screws are closely adjacent to the point where successive increments of the parison issue from the die head, i.e., that the screws are closely adjacent to the tip of the mandrel and to the material discharging portion of the nozzle. When the die head is installed in a blow molding apparatus, the orifice is immediately adjacent to the movable halves of the mold or molds, and such apparatus further comprise devices which sever the parisons as well as grippers which transfer parisons from the die head into the cavities of molds if the nature of the blow molding apparatus is such that the parisons are not extruded directly into the mold cavity. The movable parts of the blow molding apparatus are actuated at a high speed, particularly in recent types of fully automatic apparatus, so that the operator in charge of adjusting the nozzle with reference to the mandrel is likely to sustain injury unless the adjustment is carried out when the apparatus is at a standstill which, of course, results in reduced output and other inconveniences. As a rule, blow molding apparatus wherein the nozzle of the die head is adjustable with reference to the mandrel are provided with protective screens extending between the moving parts and the housing of the die head to prevent injury during adjustment. Such screens take up space which is needed for other components of the apparatus and they also interfere with adjustment of the nozzles.

SUMMARY OF THE INVENTION

It is an object of my invention to provide a die head wherein the position of the adjustable part of the means which defines the orifice for parisons can be changed in a novel and time-saving way without any danger to the operator.

Another object of the invention is to provide a die head wherein the position of the nozzle can be changed more rapidly than in presently known die heads.

A further object of the invention is to provide a die head with power-operated adjusting means for the nozzle.

An additional object of the invention is to provide a die head wherein the position of the nozzle with reference to the mandrel can be adjusted by remote control and wherein the number of adjustments necessary to shift the nozzle with reference to the mandrel requires fewer steps than in heretofore known die heads.

Still another object of the invention is to provide a die head wherein the position of the nozzle, or the position of a portion of the nozzle, can be adjusted by hand and/or by means of one or more prime movers.

A concomitant object of the invention is to provide a die head for extrusion of tubular parisons with novel and improved adjusting devices for the nozzle and to construct, assemble and operate the adjusting devices in a novel and improved way.

An ancillary object of the invention is to provide the die head with a novel synchronizing mechanism for the adjusting devices which are employed to change the position of the nozzle with reference to the mandrel.

Another object of the invention is to provide a die head wherein the nozzle is always supported at points located diametrically opposite each other with reference to the axis of the mandrel, not only when the nozzle is held in a selected position of adjustment but also when the operator decides to carry out or to effect such adjustment by remote control.

A further object of the invention is to provide novel drive means for use in a die head wherein the movements of adjusting devices for the nozzle are synchronized in a manner as outlined above.

Briefly stated, my invention is embodied in a die head which can be utilized in or in combination with a machine for the production of plastic parisons, particularly in a plastic extrusion machine which forms part of a blow molding apparatus. The die head comprises a housing, a nozzle mounted in the housing and defining an axial passage for plastic material and including a material discharging portion at one end of the passage, adjusting means for moving the material discharging portion of or the entire nozzle laterally or radially with reference to the axis of a mandrel and including a pair of adjusting devices having adjusting portions engaging the material discharging portion of the nozzle at points located substantially diametrically opposite each other with reference to the axis of the mandrel and such adjusting portions being movable laterally of the nozzle, i.e., radially of the axis of the mandrel, and synchronizing means connecting the adjusting devices for simultaneous lateral movement of their adjusting portions in the same direction so that, when the adjusting portion of one adjusting device moves inwardly (toward the axis of the mandrel) to change the position of the material discharging portion with reference to the housing, the adjusting portion of the other adjusting device moves outwardly (away from the axis of the mandrel) to permit such change in the position of the material discharging portion.

In accordance with a presently preferred embodiment of my invention, the adjusting means includes a second pair of adjusting devices having adjusting portions engaging the material discharging portion of the nozzle substantially diametrically opposite each other and alternating with the adjusting portions of the first mentioned pair of adjusting devices. The adjusting portions of the second pair of adjusting devices are movable laterally of the nozzle, and the die head further comprises second synchronizing means connecting the adjusting devices of the second pair for simultaneous movement of their adjusting portions in the same direction.

The novel features which are considered as characteristic of the invention are set forth in particular in the appended claims. The improved die head itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is a fragmentary partly elevational and partly vertical sectional view of a modified die head wherein the synchronizing means for the adjusting devices are driven by means of two electric motors;

FIG. 6 is a top plan view of the die head shown in FIG. 5;

FIG. 7 is a partly elevational and partly vertical sectional view of a third die head wherein the synchronizing means are driven by four fluid-operated motors;

FIG. 8 is a top plan view of the structure shown in FIG. 7;

FIG. 9 is a fragmentary partly elevational and partly vertical sectional view of a die head which constitutes a simplification of the die head shown in FIGS. 3 and 4;

FIG. 10 is a fragmentary top plan view of the structure shown in FIG. 9;

FIG. 11 is a fragmentary partly elevational and partly axial sectional view of a further die head which constitutes a modification of the die head shown in FIGS. 7 and 8;

FIG. 12 is a horizontal section as seen in the direction of arrows from the line XII—XII of FIG. 11;

FIG. 15 is a fragmentary partly elevational and partly vertical sectional view of a multiplex die head wherein a single motor can drive the synchronizing means for adjusting devices serving to change the position of three nozzles, the section being taken in the direction of arrows as seen from the line XV—XV of FIG. 16; and FIG. 16 is a horizontal section as seen in the direction of arrows from the line XVI—XVI of FIG. 15.

DESCRIPTION OF THE PREFERRED EMBODIMENTS

Figure 1:
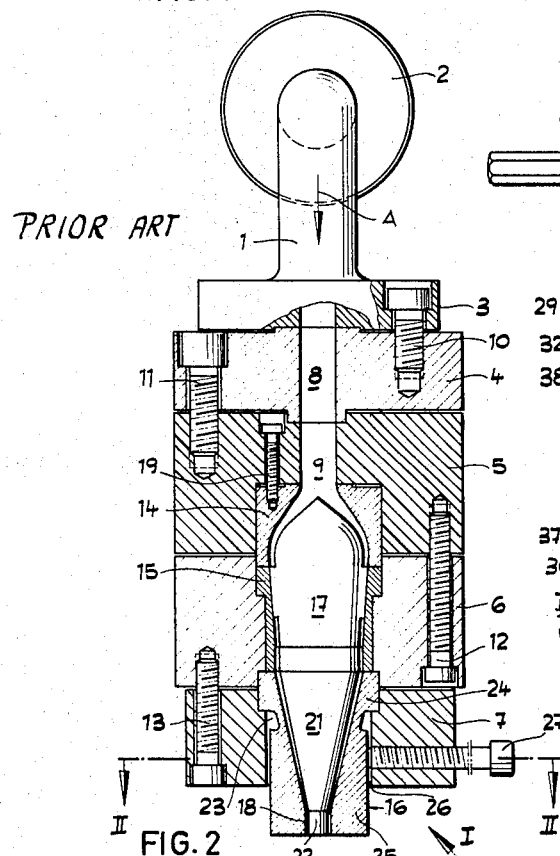
FIG. 1 is a vertical sectional view of a conventional die head, substantially as seen in the direction of arrows from the line I—I of FIG. 2.
Figure 2:
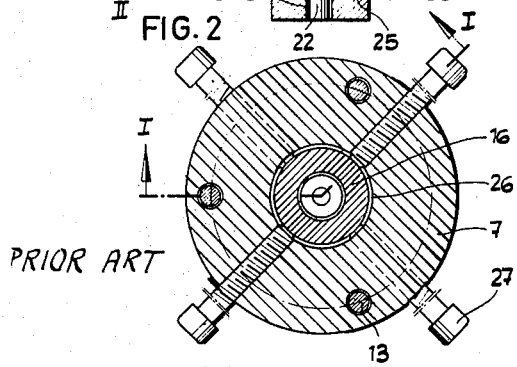
FIG. 2 is a horizontal sectional view of the conventional die head as seen in the direction of arrows from the line II—II of FIG. 1.

FIGS. 1 and 2 illustrate a conventional die head with an adjustable sleeve-like nozzle 16. The die head comprises a housing composed of four superimposed blocks or sections 4, 5, 6 and 7. The topmost section 4 is fixedly connected to the lower flange 3 of an elbow 1 which forms part of a supply conduit for plasticized material. The upper flange 2 of the elbow 1 is affixed to the discharge end of a plasticizer in a plastic extrusion machine of known design. The plasticizer may include a cylinder for one or more feed screws or a cylinder and piston assembly. The subdivision of the housing into several sections or blocks is desirable to facilitate accurate machining of the interior of the die head. The lowermost section 7 resembles a ring and serves as a support or carrier for a conventional adjusting mechanism which is employed to adjust the nozle 16. The means for releasably connecting the sections of the housing to each other and to the elbow 1 comprises screws 10 (only one shown) which secure the flange 3 to the topmost section 4, screws 11 which secure the topmost section 4 to the section 5 therebelow, screws 12 which secure the section 6 to the section 5, and screws 13 which secure the section 7 to the section 6. The topmost section 4 is provided with a centrally located vertical passageway 8 which receives plasticized material from the elbow 1 and conveys such material into a channel 9 formed in the section 5. The sections 5 and 6 accommodate sockets 14, 15 the former of which is secured to the section 5 by screws 19. The lower socket 15 is clamped between the socket 14 and the top face of the nozzle 16 in response to tightening of screws 12 and 13. The nozzle 16 is clamped in position in response to tightening of screws 13. The arrow A indicates the direction of material flow toward an annular orifice 18 defined by the material discharging lower end portion 25 of the nozzle 16 and by the cylindrical tip 22 of a suitably configurated mandrel 17 (also called torpedo or core) which is centered by the socket 15 and cooperates with the sockets 14, 15 and nozzle 16 to define therewith an annular passage for admission of plasticized material into the orifice 18. The material issuing from this orifice 18 is a so-called parison which can be used for the production of blow molded articles or as a pipe or hose. The parts 14, 15 and 16 together form a composite nozzle which is assembled of several parts for the purpose of facilitating accurate machining. Accurate machining of internal surfaces of parts 14–16 is of considerable importance in order to avoid unnecessary protuberances, dead corners, sharp edges and other protrusions or recesses which could accumulate plasticized material and/or would otherwise affect the quality of the ultimate product.

The tip 22 is provided at the lower end of a conical intermediate portion 21 of the mandrel 17. The topmost portion of the mandrel 17 resembles a cylinder and has an upwardly tapering head which causes plasticized material entering via channel 9 to flow around the mandrel and toward the orifice 18.

Adjustments in the position of a portion of or of the entire nozzle 16 are necessary because, when the die head is in use, even most accurate machining of surfaces surrounding the orifice 18 cannot prevent some variations in wall thickness of the parisons. Furthermore, it is simpler to adjust the nozzle 16 than to adjust the mandrel 17. The adjusting means of the die head shown in FIGS. 1 and 2 comprises two pairs of radially extending adjusting screws 27 which are introduced into tapped bores provided therefore in the lowermost section 7 of the housing and can be manipulated by hand or by a suitable wrench. The purpose of screws 27 is to change the configuration of the annular clearance 26 between the section 7 and the external surface of the lower end portion 25 of the nozzle 16 and to thus change the position of the lower end portion 25 with reference to the tip 22 of the mandrel 17. The top portion 24 of the nozzle 16 is fixedly clamped between the socket 15 and section 7, and this nozzle is further provided with a circumferential groove 23 extending between the portions 24, 25. The material which is surrounded by the grooves 23 form a weakened intermediate potrion or web which allows for some flexing of the lower end portion 25 with reference to the fixedly clamped portion 24. The extent of such flexing is rather small so that the width of the clearance or gap 26 is also small. An advantage of such mounting and configuration of the nozzle 16 is that the lower end portion 25 can be adjusted without changing the cross-sectional area of the passage around the major part of the mandrel 17. However, and when the nature of plasticized material permits, the entire nozzle 16 can be adjusted with reference to the mandrel 17.

The adjusting screws 27 can be located in a common plane which is normal to the axis of the mandrel 17, or each pair of coaxial screws 27 can be located in a separate plane as shown in FIG. 2. The mounting of screws 27 in two planes is desirable in multiplex die heads with two or more mandrels. In order to carry out an adjustment in the position of the lower end portion 25, the operator loosens two coaxial screws 27 so as to move their tips radially of and away from the nozzle 16, and thereupon manipulates the other two screws 27 individually to bring about requisite flexing of the lower end portion 25. The adjustment can also be carried out in such a way that the operator loosens two adjoining screws 27 (for example, the two upper screws shown in FIG. 2) and manipulates the other two screws 27 to effect requisite flexing of the lower end portion 25.

Serious problems arise when the die head of FIGS. 1 and 2 is installed in or on an extrusion machine which is used in combination with one or more blow molds. Since the parisons issuing from the orifice 18 must be blown while still in readily deformable state, the halves of each blow mold must be located directly or closely below the lower end portion 25 and section 7 so that the screws 27 are hard to reach and that the manipulation of such screws involves danger of injury to the operators. The halves of a blow mold are movable toward and away from each other or are mounted on a conveyor which moves past the lower end of the nozzle 16. Furthermore, a complete blow molding apparatus also comprises means for severing the parisons, blowing and calibrating devices, as well as certain other moving parts so that a careless or inexperienced operator is likely to sustain injury while attempting to manipulate the adjusting screws 27 when the apparatus is in use. In certain types of blow molding apparatus, the adjusting screws can be reached only upon at least partial dismantling of parts which are adjacent to the die head.

Figure 3:
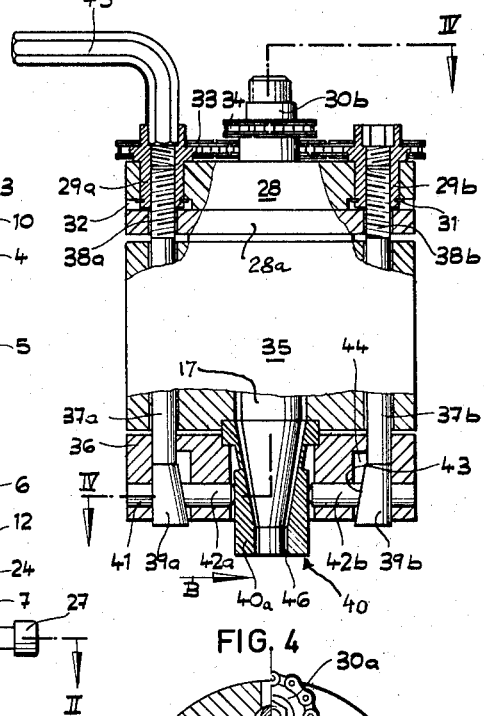
FIG. 3 is a partly elevational and partly vertical sectional view of a die head which embodies one form of my invention and wherein the cross-sectional area of the orifice defined by a nozzle and the tip of a mandrel can be adjusted by hand.
Figure 4:
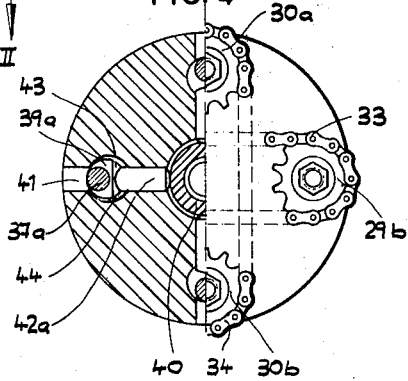
FIG. 4 is a partial top plan and partial horizontal sectional view as seen in the direction of arrows from the line IV—IV of FIG. 3.

The die head of FIGS. 3 and 4 is constructed and assembled in accordance with a first embodiment of my invention. This die head comprises a housing composed of super-imposed sections 28, 28a, 35 and 36 held together by screws or analogous fasteners, not shown. The section 35 may consist of two or more parts to facilitate the machining of its internal surfaces. The mandrel 17 is identical with the mandrel 17 of FIG. 1 and its tip defines with the material discharging lower end portion 40a of a nozzle 40 an annular orifice 46 which should have the same width all the way around the tip to insure that the wall thickness of parisons is constant. The manner in which the housing can be coupled to an extrusion machine is the same as described in connection with FIGS. 1 and 2. The adjusting means which can change the position of the lower end portion 40a of the nozzle 40 with reference to the mandrel 17 comprises four adjusting devices and each such adjusting device comprises two portions or parts, namely, a radially extending pin-shaped adjusting portion or follower (two of these followers are shown in FIG. 3 at 42a and 42b) and two axially parallel cammed portions each including a wedge-like lower part (see the wedges 39a, 39b in FIG. 3) and an externally threaded rod or spindle (see the spindles 37a, 37b in FIG. 3). The coupling means which moves the spindles axially to move the respective wedges radially comprises two synchronizing units each having two spindle nuts 29a, 29b and 30a, 30b and an endless chain 33, 34, respectively trained around sprockets forming part of the spindle nuts 29a, 29b and 30a, 30b and located above the topmost section 28. The chains 33, 34 are located in two adjacent parallel planes and each spindle nut is held against axial movement in the respective bore 32 of the topmost section 28 by a split ring 31. The spindle nuts 29a, 29b shown in FIG. 3 are respectively provided with left-hand and right-hand internal threads and the spindles 37a, 37b are respectively provided with mating threads 38a, 38b, i.e., rotation of the spindle nuts will cause the corresponding spindles to move axially together with the corresponding wedges 39a, 39b; however, while the spindle 37a moves upwardly, as viewed in FIG. 3, the spindle 37b moves downwardly, and vice versa. The same applies for the spindles which mesh with the spindle nuts 30a, 30b. Each of the wedges 39a, 39b preferably resembles a cylinder with a flat 43 which is inclined with reference to the axis of the corresponding spindle to povide a cam face serving to effect radial movements of the associated adjusting portion or follower. The followers cooperate with the wedges to prevent rotation of the spindles. These followers are reciprocable in radial bores 41 of the lowermost housing section 36. This section 36 is formed with four axially parallel cylindrical recesses 44 which accommodate the wedges.

FIG. 3 illustrates a simple L-shaped tool 45 which can be inserted into a non-circular recess in the top portion of a selected spindle nut to facilitate rotation of such spindle nut and of that spindle nut which is coupled thereto by the chain 33 or 34. The working end of the tool 45 is shown as being inserted into the recess of the spindle nut 29a; thus, if the operator turns the tool 45 in a sense to move the spindle 37a upwardly or downwardly, the spindle 37b moves downwardly or upwardly and the followers 42a, 42b move as a unit in the same direction (i.e., laterally of the nozzle 40) whereby the follower 42a or 42b deflects the lower end portion 40a of the nozzle to change the configuration of the orifice 46. One of the followers 42a, 42b can yield to the same extent as the other follower moves toward the axis of the mandrel 17, and vice versa. The same applies for the non-illustrated followers which are moved laterally of the nozzle 40 when the tool 45 is inserted into one of the spindle nuts 30a, 30b. The sprocket wheels of the spindle nuts and the chains 33, 34 effect accurate synchronization of movements of the paired adjusting devices and insure that the lower end portion 40a of the nozzle remains in each position of adjustment until and unless the operator turns one of the spindle nuts when it becomes necessary to change the configuration of the orifice 46. The direction in which the tool 45 can cause the followers 42a, 42b to move when the spindle 37a is caused to move upwardly (i.e., when the spindle 37b moves downwardly) is indicated in FIG. 3 by arrow B. The wedges and the associated followers on the one hand, and the threads of the spindles and associated spindle nuts on the other hand produce a satisfactory self-locking action which prevents accidental displacement of the nozzle 40 with reference to the mandrel 17. Thus, there is no need to provide special arresting or locking devices for the spindle nuts and/or for the spindles.

Since the chains 33, 34 and the recesses in the spindle nuts 29a, 29b, 30a, 30b are remote from the orifice 46 and nozzle 40, the tool 45 or an analogous implement can be inserted and removed without any danger to the operator because the points of application of the tool are distant from movable parts which are normally provided in the region of the orifice 46. Moreover, the adjustment can be carried out more rapidly and with greater accuracy than in the conventional die head of FIGS. 1 and 2 because two followers are moved simultaneously as long as a single spindle is caused to move axially. Still further, and since it suffices to afford access to two of the spindle nuts (for example, to the spindle nuts 29a, 30a or 30a, 29b or 29b, 30b or 30b, 29a), the die head of FIGS. 3 and 4 can be mounted on an extrusion machine in such a way that at least one-half of the upper side of the top section 28 of its housing remains inaccessible. The tool 45 can be replaced by a much longer tool so that the spindle nuts can be turned by an operator standing at a considerable distance from the section 28.

It will be readily understood that the die head of FIGS. 3 and 4 can be modified in a number of ways without departing from the spirit of my invention. For example, the chain 33 and/or 34 can be driven by means of one or more electric, hydraulic, pneumatic or other prime movers, and the operation of such prime movers can be regulated automatically, e.g., in response to signals produced by a device which measures the wall thickness of parisons. Furthermore, it is also within the purview of my invention to intentionally adjust the position of the nozzle 40 with reference to the mandrel 17 in such a way that the width of the orifice 46 will vary in the circumferential direction of the tip on the mandrel 17. However, and as a rule, adjustments in the position of the nozzle 40 are made for the purpose of insuring that the width of the orifice 46 is constant, i.e., to insure that the tip of the mandrel 17 is accurately centered in the passage defined by the nozzle 40.

FIGS. 5 and 6 illustrate the details of one of the aforementioned modifications of the die head. In this embodiment of my invention, the nozzle (not shown) is adjustable by means of two reversible electric motors (prime movers) 48a, 48b mounted on a supporting platform 47 and serving to drive the synchronizing units. The motors 48a, 48b respectively drive step-down transmissions 49a, 49b having output shafts 50 (only one shown) each of which drives one of two chains 52, 55. The chain 52 is trained around two sprocket wheels forming part of spindle nuts 53a, 53b and the chain 55 is trained around sprocket wheels forming part of spindle nuts 54a, 54b. The spindle nuts 53a, 54b are directly coupled to the output shafts 50 of the transmissions 49a, 49b. Two of the four spindles 56 are shown in FIG. 5, and the top section of the housing of the die head is shown at 51. The manner in which the spindles 56 mesh with the corresponding spindle nuts 53a, 53b, 54a, 54b and the manner in which the wedges at the lower ends of the spindles cooperate with four radially movable adjusting portions or followers is the same as described in connection with FIGS. 3 and 4. The chains 52, 55 are located in two adjacent parallel planes, see FIG. 5. The followers can flex the lower end portion of a nozzle or they can change the position of the entire nozzle with reference to the associated mandrel. The controls for the motors 48a, 48b are not shown; such controls may be provided directly on the motors or each of these motors can be actuated by remote control, for example, in response to signals produced by a device which measures the wall thickness of parisons or the wall thickness or other characteristics of blow molded articles produced from parisons. The chains 33, 34 or 52, 55 can be replaced by endless belts or bands; the corresponding spindle nuts are then provided with pulleys or sheaves. In FIGS. 5 and 6, the parts 53a, 53b, 52 and 54a, 54b, 55 constitute two synchronizing units of a coupling between the two pairs of adjusting devices, and the motors 48a, 48b and transmissions 49a, 49b constitute a drive means for the two synchronizing units. Each pair of adjusting devices comprises two spindles 56 with wedges at their lower ends, and two followers, such as the followers 42a, 42b of FIG. 3.

FIGS. 7 and 8 illustrate a die head wherein the position at the lower end portion of the nozzle 68 with reference to the tip of the mandrel 78 can be changed by adjusting devices receiving motion from hydraulically or pneumatically operated coupling means including two pairs of double-acting synchronizing cylinders 58a, 58b and 59a, 59b. Each of these cylinders is provided with a threaded plug 60 which is in mesh with internal threads provided in a tapped bore of the top section 57 of the housing of the die head. The piston rods 63 of the cylinders are provided with enlarged cylindrical portions 62 which are slidably guided in bores 61 machined into the section 57. Each of these piston rods 63 is rigid with a vertically reciprocable rod 64 forming part of one of four adjusting devices. Each such adjusting device further comprises a wedge or cam 65 at the lower end of the respective rod 64 and an adjusting portion or follower 67 reciprocable in a radial bore 66 machined into the lowermost section of the housing. The orifice is shown at 69.

The synchronizing connections between the cylinders 58a and 58b are such that when the piston rod 63 of the cylinder 58a moves upwardly, as viewed in FIG. 7, the piston rod of the cylinder 58b moves downwardly, and vice versa, i.e., that one of a pair of coaxial followers 67 moves toward the axis of the mandrel 78 while the other of these coaxial followers moves away from such axis and covers the same distance. This insures that the lower end portion of the nozzle 68 is flexed with reference to the upper portion in order to change the shape of the cross-sectional area of the orifice 69.

The system of conduits which admit a pressure medium to and evacuate pressure medium from the chambers of cylinders 58a, 58b includes a first supply conduit 70 which can admit compressed gas or pressurized liquid to a distributor 71. The latter is connected with a conduit 73 leading to the lower chamber of the cylinder 58b and with conduits 72a, 72b which can admit pressure medium to the upper chamber of the cylinder 58a. Thus, and if a valve in the conduit 70 is opened, the pressure medium causes the right-hand rod 64 of FIG. 7 to move upwardly while the left-hand piston rod 63 moves downwardly so that the right-hand follower 67 flexes the lower end portion of the nozzle 68 whereas the left-hand follower 67 moves away from the mandrel 78. A second supply conduit 74 can admit pressure medium to a second distributor 75 which is connected with the lower chamber of the cylinder 58a by way of a conduit 77 and with the upper chamber of the cylinder 58b by way of conduits 76a, 76b. Thus, fluid admitted via supply conduit 74 can cause the left-hand wedge 65 of FIG. 7 to move upwardly while the right-hand wedge moves downwardly. The conduit 70 permits outflow of pressure medium via conduits 72a, 72b, 73 and distributor 71 when the conduit 74 admits pressure medium to conduits 76a, 76b, 77, and vice versa. The manner in which the chambers of the other two cylinders 59a, 59b receive and discharge a pressure medium is analogous.

FIG. 7 further shows a sleeve 79 which is installed in the housing of the die head and is movable axially with reference to the mandrel 78. Such axial movements of the sleeve 79 can influence the wall thickness of the parison issuing from the orifice 69 by changing the counterpressure and hence the quantity of extruded plastic material per unit of time. However, the sleeve 79 (which is known in the art of die heads for plastic extrusion machines) cannot perform the function of the adjusting devices which flex the lower end portion of the nozzle 68, i.e., this sleeve cannot correct the position of the nozzle with a view to insure that the width of the orifice 69 is the same all the way around the tip of the mandrel 78.

Referring to FIGS. 9 and 10, there is shown a die head which constitutes a simplification of the die head shown in FIGS. 3 and 4. The housing 85 of the die head comprises a top section 86 which accommodates two pairs of spindle nuts 83 respectively provided with meshing toothed synchronizing members or gears 81a, 81b at a lower level and with meshing toothed synchronizing members or gears 82a, 82b at a higher level. Each spindle nut 83 has a recess 84 of other than circular outline to receive the working end of a tool shown in FIG. 9. The spindles of the adjusting devices are shown at 80, and each of these spindles has a wedge cooperating with an adjusting portion or follower in the same way as described in connection with FIGS. 3 and 4. An advantage of the construction shown in FIGS. 9 and 10 is that the inclination of internal threads in all of the spindle nuts 83 is the same, and this also applies for the external threads of spindles 80. By employing the tool to turn the gear 81a in a clockwise direction, the operator automatically causes the gear 81b to rotate in a counterclockwise direction so that the follower associated with the left-hand spindle 80 of FIG. 9 moves in the same direction and through the same distance as the follower associated with the right-hand spindle. A further advantage of the embodiment shown in FIGS. 9 and 10 is that the synchronizing units are simpler than those shown in FIGS. 3–8 and that the adjusting devices can be produced at a lesser cost because the pitch, lead and inclination of threads on all of the spindles 80 are the same.

FIG. 10 shows that portions of the gears 81a, 81b, 82a, 82b extend laterally beyond the outlines of the housing 85. If there is no room for such large gears, the die head can be modified by replacing the gears with gear segments one of which is indicated in FIG. 10 by broken lines, as at 87. Since the movements of the lower end portion of the nozzle with reference to the mandrel are rather small, such gear segments suffice to effect requisite adjustments. Instead of being turned by a manually operated tool, the gears shown in FIGS. 9 and 10 can receive torque from reversible prime movers, for example, from two reversible electric motors similar to those shown in FIGS. 5 and 6.

FIGS. 11 and 12 illustrate a die head which constitutes a modification of the die head shown in FIGS. 7 and 8, and wherein the spindle or rod of each of the four adjusting devices is movable tangentially of the nozzle 88, i.e., not in parallelism with the axis of the nozzle as in the embodiments of FIGS. 3–10. Each adjusting device comprises an adjusting portion here shown as a wedge or cam (two of these wedges are illustrated at 89a, 89b) movable in a bore 90 provided in the lowermost section 91 of the housing. The coupling means comprises two pairs of pneumatically or hydraulically operated double-acting synchronizing cylinders two of which are shown in FIG. 12 as at 92a, 92b. The piston rods 93 of these cylinders are connected with the wedges 89a, 89b and the operative connection between the cylinders is the same as shown in FIGS. 7 and 8, i.e., one of the wedges moves its cam face nearer to the axis of the mandrel shown in FIG. 11 when the other wedge moves its cam face away from such axis, and vice versa, to flex the lower end portion of the nozzle 88 and to thus change the cross-sectional outline of the annular orifice shown in FIG. 11. The other two synchronizing cylinders were omitted in FIGS. 11 and 12 for the sake of clarity; each of these cylinders has a plug which can be threaded into one of two tapped bores 94a, 94b machined into the top section of the housing of the die head. In this embodiment of my invention, those portions of the adjusting devices which are movable laterally of the nozzle 88 are constituted by the cam faces on the wedges 89a, 89b and by the cam faces on the other two wedges. The wedges 89a, 89b alternate with the other two wedges, as considered in the circumferential direction of the nozzle 88.

Figure 13:
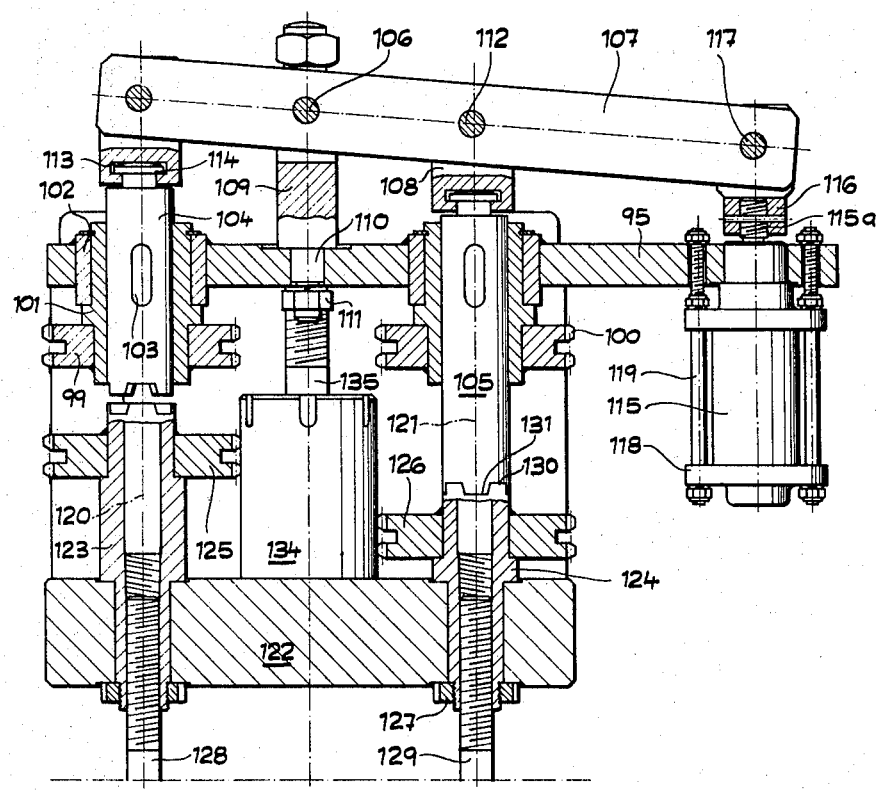
FIG. 13 is a fragmentary partly elevational and partly vertical sectional view of a further die head wherein a single motor can operate all of the synchronizing means for the adjusting devices.
Figure 14:
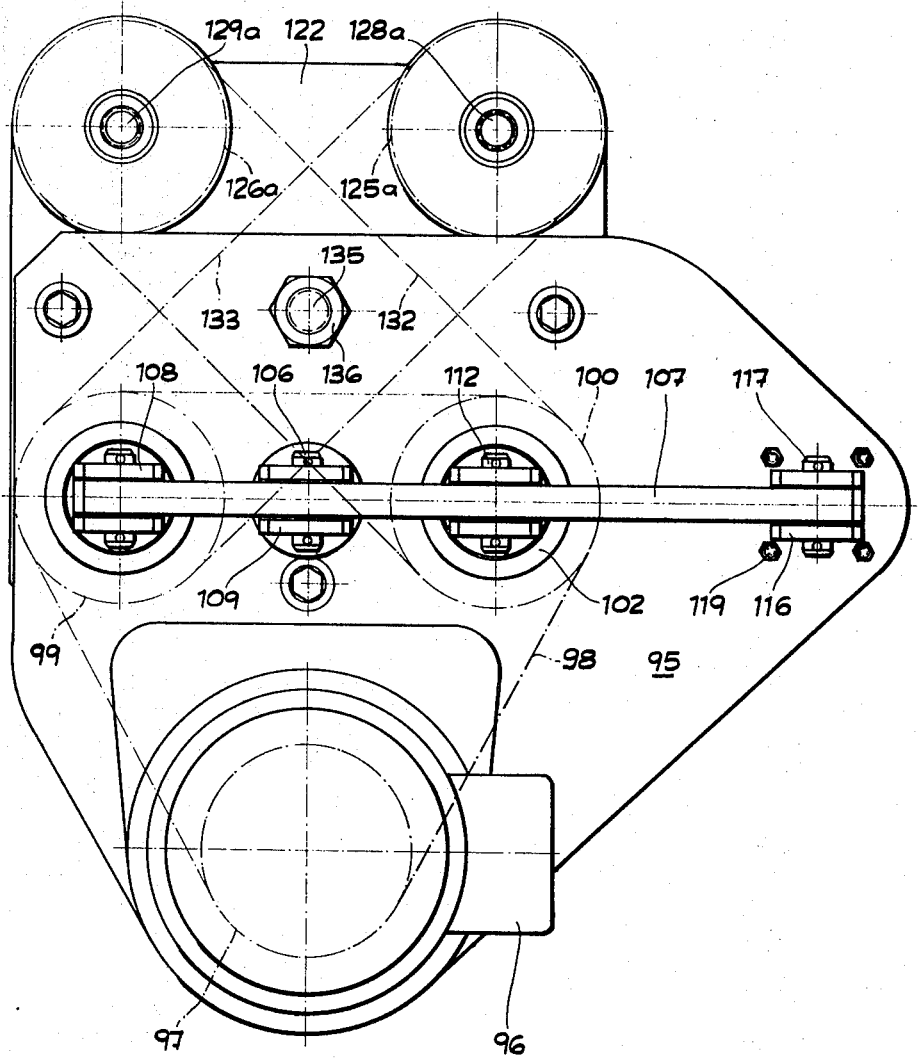
FIG. 14 is a top plan view of the structure shown in FIG. 13.

FIGS. 13 and 14 illustrate the details of a die head which constitutes a modification of the one shown in FIGS. 5 and 6. The coupling means of this die head can receive motion from a single prime mover, preferably from a reversible electric motor 96 mounted on a supporting platform 95 and driving a step-down transmission whose output shaft carries a sprocket wheel 97. An endless chain 98 is trained around the sprocket wheel 97 and around two additional sprocket wheels 99, 100. The motor 96 can be replaced by a double-acting hydraulic or pneumatic motor which can drive the shaft of the sprocket wheel 97 through the intermediary of two ratchet-and-pawl assemblies. The feature that the coupling means can be driven by or includes a single motor contributes to lower initial and maintenance cost of the die head and simplifies the controls, particularly, if the motor is started, arrested and reversed by automatic means receiving signals from a device which measures the wall thickness of parisons or of products obtained from such parisons.

The hubs 101 of the sprocket wheels 99, 100 are rotatable in bearing sleeves or bushes 102 installed in the supporting platform 95 which latter further supports a two-armed actuating lever 107 turnable on a pivot pin 106. The hubs 101 of the sprocket wheels 99, 100 are respectively connected to clutching rods 104, 105 by means of keys 103 which permit the rods to move axially but cause them to share angular movements of the respective sprocket wheels 99, 100. The clutching rods 104, 105 are movable axially in opposite directions by links 108 articulately connected to the actuating lever 107 by means of pivot pins 112 located at the opposite sides of the pivot pin 106. The latter is mounted in a bifurcated bracket 109 having a bolt 110 extending through the platform 95 and releasably affixed thereto by a nut 111. Each of the links 108 has a recess 113 for the head of a coupling bolt 114 mounted on the respective clutching rod 104 or 105. The heads of bolts 114 are received in the respective recesses 113 with requisite freedom to permit some tilting and to thus prevent jamming of the links 108 when the lever 107 is rocked about the axis of the pivot pin 106. The lever 107 can be rocked by means of a hydraulic or pneumatic double-acting servo motor 115 mounted between two plates 118 which are secured to the platform 95 by bolts 119. The piston rod 115a of the motor 115 is connected to a motion transmitting link 116 which is articulately connected to the actuating lever 107 by a pivot pin 117.

A fixed table 122 constitutes the uppermost section of the housing of the die head and supports two pairs of spindle nuts of which only two (123 and 124) are shown in FIG. 13. These spindle nuts carry sprocket wheels 125, 126 associated with sprocket wheels 125a, 126a on the other two spindle nuts. The sprocket wheels 126, 126a are located at a level below the sprocket wheels 125, 125a and the axes 120, 121 of the sprocket wheels 125, 126 respectively coincide with the axes of sprocket wheels 99, 100. Chains 132, 133 are respectively trained around the sprocket wheels 126, 126a and 125, 125a. The parts 125, 125a, 133 and 126, 126a, 132 constitute two synchronizing units of the coupling means in the die head of FIGS. 13, 14, and these synchronizing units are utilized to effect axial movements of two pairs of spindles 128, 128a, and 129, 129a in the same way as described in connection with the spindles shown in FIGS. 3 and 4. Thus, when the spindle 128 is caused to move upwardly, the spindle 128a is caused to move downwardly, as viewed in FIG. 13, or vice versa, whereby the wedges at the lower ends of these spindles cooperate with adjusting portions or followers to flex the lower end portion of the nozzle, not shown. If th external threads of the spindle 128 are right-hand threads, the threads of the spindle 128a are left-hand threads, or vice versa and the same holds true for the spindles 129, 129a and for the internal threads of spindle nuts meshing with the spindles 128, 128a and 129, 129a.

The spindle nuts 123 are longer than the spindle nuts 124 to hold the sprocket wheels 125 at a level above the level of the sprocket wheels 126, see FIG. 13. These spindle nuts are held against axial movement with reference to the platform 95 by lock nuts 127. The spindle nut 124 constitutes a second element of a simple clutch whose other element is constituted by the clutching rod 105. Its upper end portion is provided with teeth or claws 130 which can engage with teeth or claws 131 at the lower end of the rod 105 when the lever 107 assumes the position shown in FIG. 13. Similar teeth or claws are provided on the spindle nut 123 and clutching rod 104, and these claws mesh when the lever 107 is tilted in a counterclockwise direction to disengage the claws 131 from the claws 130. Thus, the motor 96 can drive the spindle nut 123 (and hence the spindles 128, 128a) when the rod 105 is disengaged from the spindle nut 124, or vice versa. When the spindle nut 123 rotates in a sense to move the spindle 128 upwardly, the spindle 128a moves downwardly, and vice versa. When the motor 96 is running, the chain 98 drives the sprocket wheels, 99, 100; however, only one of these sprocket wheels can cause axial movements of the associated pairs of spindles 128, 128a or 129, 129a. The servo motor 115 can be operated by remote control, for example, by means of the aforementioned device which measures the wall thickness of parisons or the wall thickness of finished products.

The numeral 134 denotes a nut which can move axially of a holder 135 for the mandrel of the die head shown in FIGS. 13 and 14. This nut 134 can be rotated to change the position of a sleeve serving to regulate the wall thickness of parisons by adjusting the rate at which the plastic material issues from the orifice of the nozzle. The holder 135 is connected to the supporting platform 95 by a nut 136.

The drive for the spindle nuts 123, 124 can be simplified by replacing the sprocket wheels 97, 99, 100 and chain 98 by three meshing gears. Also, these sprocket wheels and chain 98 can be replaced by a belt and three pulleys or sheaves.

Referring finally to FIGS. 15 and 16, there is shown a multiplex die head which comprises a housing 142 having three mandrels 139a, 139b, 139c, provided cylindrical tips 138a, 138b, 138c surrounded by adjustable nozzles 140a, 140b, 140c. One of the orifices is shown at 141. The top section of the housing 142 is shown at 143, and the numeral 144 denotes a supporting platform for a single electric motor 137 whose output shaft drives a gear 147 meshing with a gear 152 coaxially surrounding the holder 146 for the mandrel 139a. An axially movable sleeve 145 surrounds the holder 145. This sleeve can be moved axially by means of a nut shown in FIG. 15 above the platform 144. The gear 152 is rigid with a hub 148 which is rotatable on the sleeve 145 and is connected with a clutch element 150 by means of a key 149 or the like. The clutch element 150 is movable axially of the hub 148 but shares its angular movements. The means for moving the clutch element 150 axially comprises a shifting fork 151 which can be actuated by a suitable double-acting fluid-operated servo motor corresponding to the motor 115 of FIG. 13. The hub 148 (which is rotatable by the gear 152 in response to rotation of the gear 147) carries two axially spaced synchronizing gears 153, 154 which are freely rotatable thereon and are respectively provided with facing teeth or claws 155, 156. These claws can respectively engage with claws 157, 158 provided on the clutch element 150 when the latter is shifted by fork 151 upwardly or downwardly along the hub 148.

The synchronizing gear 153 meshes with two pinions 159a, 159b which are located diametrically opposite each other and form parts of spindle nuts meshing with vertically movable spindles 161 corresponding to the spindles described in connection with FIGS. 3 and 4. The wedges 162 at the lower ends of the spindles cooperate with two radially movable adjusting portions or followers 163 which can displace the entire nozzle 140a with reference to the mandrel 139a. The threads on the spindles 161 shown in FIG. 15 are inclined in opposite directions so that one of the wedges 162 moves upwardly when the other wedge moves downwardly, and vice versa.

The synchronizing gear 154 meshes with two pinions 160a, 160b which alternate with pinions 159a, 159b but are installed at a lower level. These pinions form part of two additional spindle nuts meshing with two spindles which are movable axially but in opposite directions. It will be seen that, when the motor 137 is started to drive the gears 147 and 152, the position of the shifting fork 151 will determine whether the clutch element 150 rotates the synchronizing gear 153 or 154, i.e., whether the gear 147 drives the pinions 159a, 159b or the pinions 160a, 160b.

The gear 152 can drive a gear 152b through the intermediary of a gear 152a, and each of these gears 152a, 152b can effect adjustments in the cross-sectional area of the orifice between the tip 138b or 138c and nozzle 140b or 140c. The shifting forks which are employed to transmit torque from the gears 152a, 152b to the one or the other pair of pinions corresponding to pinions 159a, 159b and 160a, 160b are not shown in FIGS. 15 and 16. The cross-sectional areas of all three orifices can be adjusted simultaneously or individually, depending on the position of the respective shifting forks. Each of these forks can hold the respective clutch element 150 in a neutral position in which the synchronizing gears 153, 154 are idle.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a machine for producing parisons of plastic material, a die head comprising a housing; a nozzle mounted in said housing and defining a passage for plastic material, said nozzle having a material discharging portion at one end thereof; adjusting means for moving at least said material discharging portion of said nozzle laterally and including a pair of adjusting devices having adjusting portions engaging said nozzle at points located substantially diametrically opposite each other and said adjusting portions being movable laterally of said nozzle; and synchronizing means connecting said adjusting devices for simultaneous movement of said adjusting portions in the same direction so that, when one of said adjusting portions moves inwardly to change the position of said material discharging portion with reference to said housing, the other adjusting portion moves outwardly to permit such change in position.

2. A die head as defined in claim 1, wherein said adjusting means further includes a second pair of adjusting devices having second adjusting portions engaging said nozzle substantially diametrically opposite each other and alternating with said first mentioned adjusting portions, said second adjusting portions being movable laterally of said nozzle and further comprising second synchronizing means connecting the adjusting devices of said second pair for simultaneous movement of said second adjusting portions in the same direction.

3. A die head as defined in claim 1, wherein said housing comprises an annular section which surrounds with clearance said material discharging portion and wherein said adjusting portions of said adjusting devices are movably mounted in said section.

4. A die head as defined in claim 1, further comprising a mandrel mounted in said housing and having a tip extending into and defining with said material discharging portion an annular orifice through which the plastic material issues to form a parison, said adjusting portions of said adjusting devices being movable substantially radially of said mandrel.

5. A die head as defined in claim 1, wherein said adjusting portions comprise followers reciprocable in coaxial bores provided in said housing and extending radially of said nozzle, said adjusting devices further comprising cam means reciprocable in said housing in substantial parallelism with the axis of said nozzle and having cam faces engaging the respective followers.

6. A die head as defined in claim 5, wherein said adjusting devices further comprise spindles reciprocable in said housing in parallelism with the axis of said nozzle and each connected with one of said cam means, said synchronizing means comprising means for simultaneously moving said spindles axially to thereby effect radial movements of said followers.

7. A die head as defined in claim 6, wherein said spindles are provided with external threads and said synchronizing means comprises spindle nuts rotatably mounted in said housing and meshing with said spindles.

8. A die head as defined in claim 7, wherein said synchronizing means further comprises means for rotating one of said spindle nuts in response to rotation of the other spindle nut, and vice versa.

9. A die head as defined in claim 8, wherein the means for rotating said spindle nuts comprises a sprocket wheel provided on each spindle nut and a chain trained around said sprocket wheels.

10. A die head as defined in claim 8, wherein one of said spindles is provided with left-hand threads and the other spindle is provided with right-hand threads so that said one spindle moves in a first direction when the other spindle moves in the opposite direction, and vice versa.

11. A die head as defined in claim 8, wherein the means for rotating said spindle nuts comprises a plurality of toothed members meshing with each other and including a pair of toothed members each affixed to one of said spindle nuts.

12. A die head as defined in claim 11, wherein at least said two toothed members constitute gear segments.

13. A die head as defined in claim 8, wherein at least one of said spindle nuts comprises a portion of other than circular outline adapted to be engaged by a manually manipulated implement.

14. A die head as defined in claim 1, wherein said adjusting means further includes a second pair of adjusting devices having second adjusting portions engaging said nozzle substantially diametrically opposite each other and alternating with said first mentioned adjusting portions, said second adjusting portions being movable laterally of said nozzle and further comprising second synchronizing means connecting the adjusting devices of said second pair for simultaneous movement of said second adjusting portions in the same direction, each of said adjusting devices further comprising a member movable substantially axially of said nozzle and said members being equidistant from each other as seen in the circumferential direction of said nozzle.

15. A die head as defined in claim 14, wherein each of said members comprises means for moving the corresponding adjusting portion substantially radially of the nozzle in response to axial movement of the respective member with reference to said nozzle.

16. A die head as defined in claim 1, wherein said adjusting means further includes a second pair of adjusting devices having second adjusting portions engaging said nozzle substantially diametrically opposite each other and alternating with said first mentioned adjusting portions, said second adjusting portions being movable laterally of said nozzle and further comprising second synchronizing means connecting the adjusting devices of said second pair for simultaneous movement of said second adjusting portions in the same direction, and drive means for selectively operating said first mentioned and said second synchronizing means to move the respective adjusting portions with reference to said housing.

17. A die head as defined in claim 16, wherein said drive means comprises at least one prime mover for each of said synchronizing means.

18. A die head as defined in claim 17, wherein each of said prime movers comprises a motor and a transmission operatively connecting each motor with the respective synchronizing means.

19. A die head as defined in claim 16, wherein said drive means comprises a single prime mover and clutch means operative to provide a driving connection between said prime mover and one of said synchronizing means at a time.

20. A die head as defined in claim 19, wherein said prime mover is a reversible motor and said drive means further comprises an endless chain driven by said motor and a pair of sprocket wheels driven by said chain, said clutch means comprising two clutches each having a first clutch element driven by one of said sprocket wheels and a second clutch element provided on one of said synchronizing means, each of said first clutch elements being movable into and out of engagement with the corresponding second clutch element and one of said first clutch elements being disengaged in response to engagement of the other first clutch element.

21. A die head as defined in claim 20, wherein said first clutch elements are rods which are movable axially of the respective sprocket wheels and wherein each of said synchronizing means comprises a pair of spindle nuts rotatably mounted in said housing and means for rotating one of said spindle nuts in response to rotation of the other spindle nut, each of said second clutch elements being provided on one spindle nut of each synchronizing means.

22. A die head as defined in claim 16, wherein said drive means comprises a prime mover, and a clutch driven by said prime mover and operative to selectively connect the latter with one of said synchronizing means at a time.

23. A die head as defined in claim 22, further comprising a mandrel having a tip surrounded by and defining with said material discharging portion an annular orifice for plastic material, and a sleeve mounted in said housing and surrounding a portion of said mandrel, said clutch comprising a clutch element rotatably mounted on and coaxial with said sleeve.

24. A die head as defined in claim 23, wherein each of said synchronizing means comprises a pair of pinions and a gear meshing with each pair of pinions, said clutch further comprising means for transmitting torque to one of said gears in response to axial movement of said clutch element.

25. A die head as defined in claim 22, further comprising at least one additional nozzle and associated additional adjusting and synchronizing means, and additional clutch means operative to establish motion transmitting connections between said prime mover and said additional synchronizing means.

26. A die head as defined in claim 1, wherein said synchronizing means comprises a pair of double-acting fluid-operated motors each operatively connected with one of said adjusting devices for moving the same reference to said housing.

27. A die head as defined in claim 26, wherein each of said adjusting devices further comprises a member movable in said housing axially of said nozzle to thereby move the respective adjusting portion laterally of the nozzle, each of said motors having a piston rod connected with one of said members and further comprising conduit means for admitting a pressure medium to said motors in such a way that the piston rod of one motor moves in a first direction when the piston rod of the other motor moves in the opposite direction.

28. A die head as defined in claim 27, wherein each of said members comprises a cam which engages the respective adjusting portion.

29. A die head as defined in claim 26, wherein each of said adjusting portions comprises a cam face and wherein each of said adjusting devices further comprises a member reciprocable in said housing substantially tangentially of said nozzle to thereby move portions of said cam faces laterally of said material discharging portion, each of said members being connected to one of said motors.

30. A die head as defined in claim 26, wherein each of said motors comprises a double-acting cylinder fixed to said housing.

References Cited

UNITED STATES PATENTS

| | | | |
|---|---|---|---|
| 457,482 | 8/1891 | Royle et al. | 18—13 |
| 2,963,741 | 12/1960 | Longstreth et al. | 18—14 |
| 3,178,770 | 4/1965 | Willis | 18—13 X |
| 3,390,430 | 7/1968 | Lynch et al. | 18—14 X |
| 3,416,190 | 12/1968 | Mehnert | 18—14 |

WILBUR L. McBAY, Primary Examiner

U.S. Cl. X.R.

18—12